(12) United States Patent
Kumar et al.

(10) Patent No.: US 10,900,507 B2
(45) Date of Patent: Jan. 26, 2021

(54) DISTRIBUTION OF A MULTI-PHASE FLUID MIXTURE

(71) Applicant: INDIAN OIL CORPORATION LIMITED, Mumbai (IN)

(72) Inventors: Pravesh Kumar, Faridabad (IN); Kamal Kumar, Faridabad (IN); Darshankumar Manubhai Dave, Faridabad (IN); Ramesh Karumanchi, Faridabad (IN); Madhusudan Sau, Faridabad (IN); Debasis Bhattacharyya, Faridabad (IN); Sanjiv Kumar Mazumdar, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 111 days.

(21) Appl. No.: 16/206,939

(22) Filed: Nov. 30, 2018

(65) Prior Publication Data
US 2019/0264716 A1    Aug. 29, 2019

(30) Foreign Application Priority Data
Feb. 23, 2018 (IN) .............................. 201821006979

(51) Int. Cl.
| | |
|---|---|
| *F15D 1/00* | (2006.01) |
| *B01J 4/00* | (2006.01) |
| *B01J 8/04* | (2006.01) |
| *B01J 8/02* | (2006.01) |

(52) U.S. Cl.
CPC .............. *F15D 1/001* (2013.01); *B01J 4/002* (2013.01); *B01J 4/005* (2013.01); *B01J 8/0278* (2013.01); *B01J 8/0492* (2013.01); *B01J 2208/00902* (2013.01); *B01J 2208/00929* (2013.01)

(58) Field of Classification Search
CPC .. F15D 1/001; B01J 4/002; B01J 4/005; B01J 8/0278; B01J 8/0492; B01J 2208/00902; B01J 2208/00929
USPC ......... 261/78.2, 94–99, 108–114.5; 422/220, 422/224, 604, 607
See application file for complete search history.

(56) References Cited

U.S. PATENT DOCUMENTS

| | | | | |
|---|---|---|---|---|
| 2,061,830 A | * | 11/1936 | Campbell .............. | B01D 3/163 261/113 |
| 2,568,875 A | * | 9/1951 | Hartmann .............. | B01D 47/06 261/111 |
| 3,488,037 A | * | 1/1970 | Landau .................. | B01D 3/328 366/335 |

(Continued)

*Primary Examiner* — William M McCalister
(74) *Attorney, Agent, or Firm* — Maschoff Brennan

(57) ABSTRACT

A distribution unit for distributing a multi-phase fluid mixture is disclosed. The distribution unit includes a distribution body defining a first passage, and a first distal body portion having a plurality of first slots. The distribution body includes a second distal body portion having a plurality of second slots distributed on a side wall of the second distal body portion. Each of the plurality of second slots is adapted to accommodate a baffle plate. The second distal body portion includes at least one aperture formed on a bottom wall of the second distal body portion. The plurality of first slots, the plurality of second slots, and the at least one aperture are in fluid communication with the first passage to discharge the flow of the multi-phase fluid.

13 Claims, 7 Drawing Sheets

(56) References Cited

U.S. PATENT DOCUMENTS

| | | | | |
|---|---|---|---|---|
| 3,498,755 A * | 3/1970 | Borre | C07C 5/333 | 422/607 |
| 3,824,081 A * | 7/1974 | Smith | B01J 8/0492 | 422/217 |
| 4,087,252 A * | 5/1978 | Strahorn | B01J 8/0278 | 208/146 |
| 4,126,540 A * | 11/1978 | Grosboll | B01J 8/0278 | 208/146 |
| 4,140,625 A * | 2/1979 | Jensen | B01J 8/0492 | 208/146 |
| 4,836,989 A * | 6/1989 | Aly | B01J 8/0453 | 422/605 |
| 5,013,491 A * | 5/1991 | Nutter | B01D 53/185 | 261/97 |
| 5,158,714 A * | 10/1992 | Shih | B01D 3/008 | 261/96 |
| 5,403,560 A * | 4/1995 | Deshpande | B01D 3/20 | 239/590 |
| 5,403,561 A * | 4/1995 | Koros | B01J 8/0492 | 239/517 |
| 5,462,719 A * | 10/1995 | Pedersen | B01D 3/008 | 422/220 |
| 5,942,162 A * | 8/1999 | Gamborg | B01J 8/0492 | 261/109 |
| 6,093,373 A * | 7/2000 | Darmancier | B01J 8/0278 | 422/220 |
| 7,972,570 B2 * | 7/2011 | Vieira | B01D 3/008 | 422/220 |
| 8,211,375 B2 * | 7/2012 | Parimi | B01F 3/0446 | 261/109 |
| 8,517,353 B2 | 8/2013 | Bannon | | |
| 8,695,953 B2 * | 4/2014 | Xu | B01D 3/008 | 261/110 |
| 9,399,229 B2 * | 7/2016 | Nascimento | B01D 3/008 | |
| 2005/0062178 A1 * | 3/2005 | Harter | B01J 8/0453 | 261/96 |
| 2005/0163682 A1 * | 7/2005 | Jacobs | B01J 8/0278 | 422/228 |
| 2006/0163758 A1 * | 7/2006 | Muller | B01D 3/26 | 261/114.1 |
| 2007/0241467 A1 * | 10/2007 | Sevenhuijsen | B01J 4/002 | 261/97 |
| 2010/0019061 A1 * | 1/2010 | Kumar | B01J 8/0278 | 239/269 |
| 2011/0004009 A1 * | 1/2011 | Itoh | B01J 8/008 | 549/518 |
| 2012/0073663 A1 * | 3/2012 | Bannon | B01D 3/205 | 137/1 |
| 2015/0001742 A1 * | 1/2015 | Xu | B01J 8/0492 | 261/114.5 |

* cited by examiner

DISTRIBUTION OF A MULTI-PHASE FLUID MIXTURE

FIELD OF THE INVENTION

The present disclosure relates to distribution of a multi-phase fluid mixture and in particular, relates to a distribution unit and a method for distributing the multi-phase fluid mixture.

BACKGROUND

Hydro-processing reactors are widely used for performing various catalytic processes, such as hydro-cracking process and hydro-treating process in chemical industries or petroleum refining industries. In such processes, a hydrocarbon feedstock is reacted with a hydrogen gas over a catalytic bed at an elevated temperature and pressure in the hydro-processing reactor. In order to effectively use a catalyst material of the catalyst bed, the hydrocarbon feedstock and the hydrogen gas should be uniformly distributed over the catalyst bed in the hydro-processing reactor.

Generally, the hydro-processing reactor includes a plurality of distribution units for distributing reactants, such as the hydrocarbon feedstock and the hydrogen gas, over the catalyst bed. Such distribution units have minimal spray angle for distributing the reactants over the catalyst bed. Owing to minimal spray angle, the distribution units fail to provide uniform distribution of the reactants over the catalyst bed. Such non-uniform distribution of the reactants may lead to reduction in overall efficiency of the hydro-processing reactor.

Usually, the catalytic processes are exothermic in nature and any maldistribution of reactants might lead to formation of hot-spots on the catalytic bed. In particular, if the reactants are non-uniformly distributed over the catalytic bed, then certain portion of the catalyst material might remain devoid of the reactants. This may lead to formation of hot-spots on the catalyst bed. Owing to such hot-spots formation, the catalytic process may lead to poor quality of final product(s) or formation of undesired product(s). Also, hot-spots formation may lead to degradation of the catalyst material that may further result in reduction of overall life of the catalyst material. Furthermore, the non-uniform distribution of the reactants may lead to reduction in stability of the catalyst material which is undesirable. Thus, the uniform distribution of the reactant over the catalyst bed is essential to achieve maximum utilization of the catalyst material and to avoid potential risks caused by stagnant zones and channeling.

By way of example, U.S. Pat. No. 4,126,540, hereinafter referred to as '540 patent, discloses a chimney type distributor having aperture at a point along the length of chimney tray below the top opening of chimney member. A plate at top opening of the chimney tray restricts the direct entry of fluid through top opening. The vapor passes through its top opening around the plate and liquid passes through the aperture. However, this type of tray is very sensitive to tray levelness.

By way of another example, U.S. Pat. No. 5,158,714, hereinafter referred to as '714 patent, discloses an apparatus for vapor-liquid distribution comprising riser and cap spaced apart from the upper end of riser. The lower end of riser has a dispersion plate to produce a mist flow of liquid and vapor. However due to restriction in the flow, the pressure drop in this design will be much higher. Moreover, only the catalyst portion directly below the riser will be wetted.

By way of another example, U.S. Pat. No. 5,942,162, hereinafter referred to as '162 patent, discloses a vapor lift distribution tray fitted with an inverted "U"-shaped device termed "vapor lift tube", which may be round, square, rectangular or any other shape and arranged on either a square, triangular, radial or other symmetrical pattern. However, in the absence of any secondary distributor, only the catalyst portion directly below the tube will be wetted By way of another example, U.S. Pat. No. 8,517,353, hereinafter referred to as '353 patent, discloses apparatuses and methods for distributing vapor and liquid flow. Problems with maldistribution, due to 'out of level' positioning of the distributor tray, are addressed by varying the height of caps and/or their openings to control the liquid flow profile (distribution) that results due to the rising liquid level. However, the '353 patent discloses non-uniform heights of openings in caps extending above the surface compared to operation using uniform opening heights as large reactor plates which generally have an offset in levelness. A large range of liquid flow rates might result in operation with a disproportionate quantity of the equilibrated liquid phase residing at or near the level of openings on one side of the reactor, thereby causing flow maldistribution.

In the above mentioned prior arts, the distributor tray for the flow of the reactants i.e., vapor and liquid, are based either on chimney tray principle or on the bubble cap/vapor lift principle. However, the distributor tray based on the chimney tray principle is sensitive to tray levelness. Likewise, the flow distribution is not uniform in the distributor tray based on the bubble cap tray principle due to lower number of drip points. Further, as there is no secondary distributor, the portion of the catalyst bed directly below the chimney or riser will be wetted. Hence, due to limitation in their designs the above mentioned distributor units fail to uniformly distribute the reactants across a radial cross-section of the catalyst bed.

Therefore, there is a need for an improved solution for distribution of the multi-phase fluid mixture.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

In an embodiment of the present disclosure, a distribution unit for distributing a multi-phase fluid mixture is disclosed. The distribution unit includes a distribution body defining a first passage for a flow of the multi-phase fluid mixture. The distribution body includes a first distal body portion having a plurality of first slots in fluid communication with the first passage. The plurality of first slots discharges the flow of the multi-phase fluid mixture. The distribution body includes a second distal body portion disposed downstream to the first distal body portion. The second distal body portion includes a plurality of second slots distributed on a side wall of the second distal body portion. Each of the plurality of second slots is adapted to accommodate a baffle plate. The second distal body portion includes at least one aperture formed on a bottom wall of the second distal body portion. The plurality of second slots and the at least one aperture are in fluid communication with the first passage to discharge the flow of the multi-phase fluid mixture.

In another embodiment of the present disclosure, a distribution unit for a hydro-processing reactor is disclosed.

The distribution unit includes a distribution body defining a first passage for a flow of the multi-phase fluid mixture. The distribution body includes a first body portion having a plurality of first inlet slots to allow a flow of a gas in the first passage. Further, the distribution body includes a second body portion disposed downstream to the first body portion. The second body portion has a plurality of second inlet slots to allow a flow of a liquid in the first passage. The flow of the liquid mixes with the flow of the gas to form the multi-phase fluid mixture within the first passage. Further, the distribution unit may include a cap member affixed to the second body portion and defining a second passage between the cap member and the second body portion. The second passage is adapted to allow the flow of the liquid to the first passage through the plurality of second inlet slots.

In yet another embodiment, a hydro-processing reactor is disclosed. The hydro-processing reactor may include at least one distributor tray. Further, the hydro-processing reactor may include at least one catalyst bed disposed below the at least one distributor tray. The hydro-processing reactor includes a plurality of distribution units arranged on the at least one distributor tray. The plurality of distribution units is adapted to discharge a multi-phase fluid mixture on the at least one catalyst bed. Each of the plurality of distribution units includes a distribution body defining a first passage for a flow of the multi-phase fluid mixture. The distribution body includes a first distal body portion having a plurality of first slots in fluid communication with the first passage. The plurality of first slots discharges the flow of the multi-phase fluid mixture. Further, the distribution body includes a second distal body portion disposed downstream to the first distal body portion. The second distal body portion includes a plurality of second slots distributed on a side wall of the second distal body portion. Each of the plurality of second slots is adapted to accommodate a baffle plate. The second distal body portion includes at least one aperture formed on a bottom wall of the second distal body portion. The plurality of second slots and the at least one aperture are in fluid communication with the first passage to discharge the flow of the multi-phase fluid mixture.

In another embodiment, a method for distributing a multi-phase fluid mixture by a distribution unit is disclosed. The method includes collecting a flow of a gas in the distribution unit. The distribution unit includes a distribution body defining a first passage adapted to receive the flow of the gas through a plurality of first inlet slots. The method includes collecting a flow of a liquid in the distribution unit. The distribution unit includes a cap member affixed to a second body portion and defining a second passage between the cap member and the second body portion. The second passage is adapted to allow the flow of the liquid to the first passage through a plurality of second inlet slots. Further, the method includes mixing the flow of the liquid with the flow of the gas within the first passage to form a flow of the multi-phase fluid mixture. The method includes distributing the flow of the multi-phase fluid mixture through a plurality of first slots. The plurality of first slots is formed on the distribution unit and being in fluid communication with the first passage. The method also includes distributing the flow of the multi-phase fluid mixture through a plurality of second slots. The plurality of second slots is disposed downstream to the plurality of first slots on the distribution body and being in fluid communication with the first passage. Further, the method includes distributing the flow of the multi-phase fluid mixture through at least one aperture being disposed downstream to the plurality of first slots on the distribution body. The at least one aperture is in fluid communication with the first passage.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
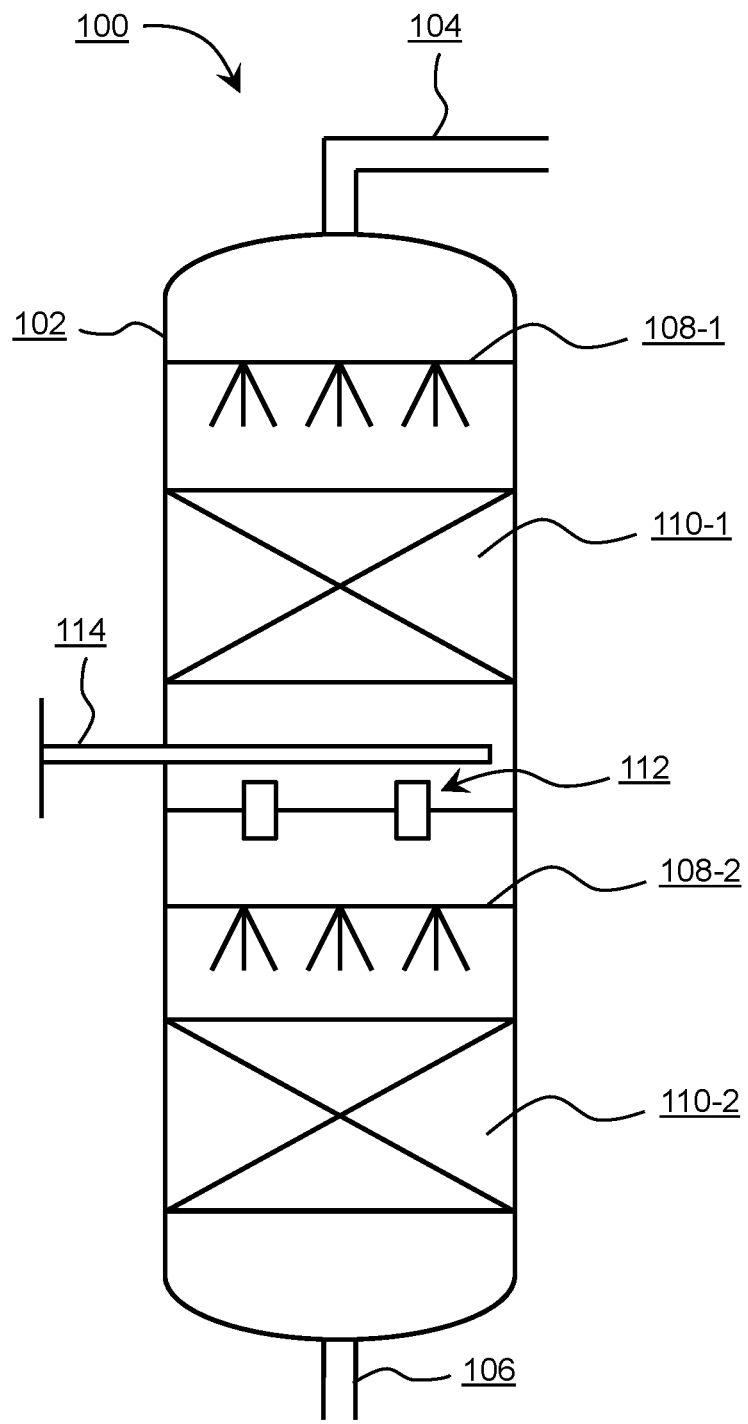
FIG. 1 illustrates a sectional view of a hydro-processing reactor, according to an embodiment of the present disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

Embodiments of the present invention will be described below in detail with reference to the accompanying drawings.

FIG. 1 illustrates a sectional view of a hydro-processing reactor 100, according to an embodiment of the present disclosure. The hydro-processing reactor 100 may be embodied as a fixed bed hydro-processing reactor. The hydro-processing reactor 100 may be employed in various chemical and petroleum refining industries for performing various chemical processes. In an embodiment, the hydro-processing reactor 100 may be employed for performing chemical process, including but not limited to, hydrocracking process and hydro-treating process. In an embodiment, the hydro-processing reactor 100 may be employed to perform the hydro-treating process for removing impurities from a hydrocarbon feedstock in presence of a gas, such as hydrogen gas, and a solid catalyst. In another embodiment, the hydro-processing reactor 100 may be employed to perform the hydro-cracking process for breaking down complex molecules in the hydrocarbon feedstock into simpler molecules, in presence of the hydrogen gas and the solid catalyst.

Further, the present disclosure is explained with the hydro-processing reactor 100 embodied as three-phase fixed bed reactor, also referred to as trickle bed reactor. However, it should be appreciated by a person skilled in the art that it should not be construed as limiting, and the present disclosure is equally applicable to other types of the hydro-processing reactor 100 as well, without departing from the scope of the present disclosure.

In an embodiment, the hydro-processing reactor 100 may include a housing member 102 for encapsulating various components therein. In an embodiment, the hydro-processing reactor 100 may include, but is not limited to, an inlet conduit 104 and an outlet conduit 106. The inlet conduit 104 may be adapted to allow a flow of a gas and a flow of a liquid in the hydro-processing reactor 100. In an embodiment, the inlet conduit 104 may allow the flow of the gas and the flow of the liquid in the housing member 102. The outlet conduit 106 may be disposed downstream to the inlet conduit 104 of the hydro-processing reactor 100. The outlet conduit 106 may be configured to discharge the flow of the liquid and the flow of the gas from the hydro-processing reactor 100. In an embodiment, the outlet conduit 106 may discharge the flow of the gas and the flow of the liquid from the housing member 102.

Further, the hydro-processing reactor 100 may include a plurality of distributor trays 108-1, 108-2 and a plurality of catalyst beds 110-1, 110-2. The plurality of distributor trays 108-1, 108-2 may interchangeably be referred to as the distributor trays 108-1, 108-2 without departing from the scope of the present disclosure. Similarly, the plurality of catalyst beds 110-1, 110-2 may interchangeably be referred to as the catalyst beds 110-1, 110-2, without departing from the scope of the present disclosure. Further, the distributor trays 108-1, 108-2 may individually be referred to as the distributor tray 108-1 and the distributor tray 108-2, without departing from the scope of the present disclosure. Similarly, the catalyst beds 110-1, 110-2 may individually be referred to as the catalyst bed 110-1 and the catalyst bed 110-2, without departing from the scope of the present disclosure.

Although the embodiment shown in FIG. 1 includes two distributor trays 108-1, 108-2 and two catalysts beds 110-1, 110-2, it will be appreciated by those skilled in the art that the hydro-processing reactor in accordance with the present disclosure may include more than two distributor trays and more than two catalyst beds. In an embodiment, the hydro-processing reactor 100 may include only one distributor tray and only one catalyst bed, without departing from the scope of the present disclosure.

Figure 2A:
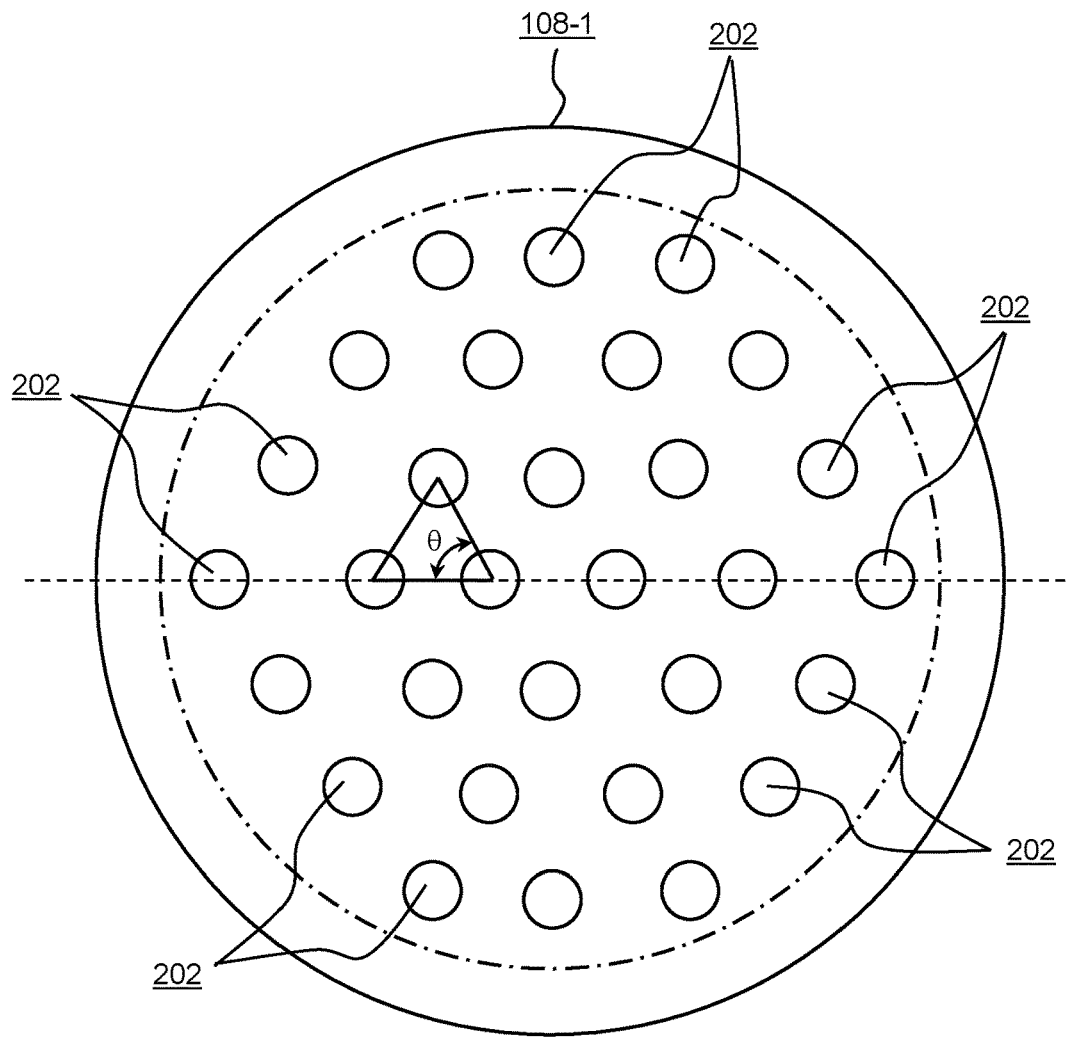
FIGS. 2a and 2b illustrate a top view and a side view of a distributor tray of the hydro-processing reactor, respectively, according to an embodiment of the present disclosure.
Figure 2B:
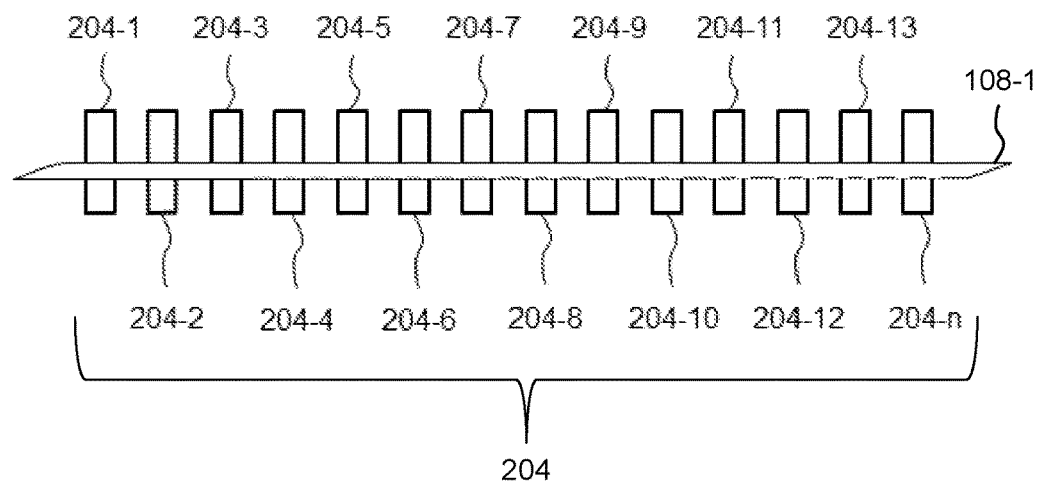

FIGS. 2a and 2b illustrate a top view and a side view of the distributor tray, such as the distributor tray 108-1 of the hydro-processing reactor 100, respectively, according to an embodiment of the present disclosure. For the sake of simplicity and better understanding, constructional details of the distributor tray are explained with respect to the distributor tray 108-1 of the hydro-processing reactor 100. As would be appreciated by the person skilled in the art, the description of the distributor tray 108-1 is equally applicable to the distributor tray 108-2 of the hydro-processing reactor 100, without departing from the scope of the present disclosure.

Referring to FIG. 1, FIG. 2a, and FIG. 2b, in an embodiment, the distributor trays 108-1, 108-2 may be positioned downstream to the inlet conduit 104 within the housing member 102. The distributor trays 108-1, 108-2 may be equally spaced apart from each other along a downward direction within the housing member 102. The downward direction herein may be referred to a direction of the flow of the gas and the flow of the liquid within the housing member 102. In an embodiment, the distributor tray 108-1, 108-2 may be horizontally oriented within the housing member 102 of the hydro-processing reactor 100. The distributor tray 108-1 may be adapted to receive the flow of the gas and the flow of the liquid from the inlet conduit 104 of the hydro-processing reactor 100. In an embodiment, the distributor tray 108-1 may hold a sufficient amount of the liquid received from the inlet conduit 104, due to vapour-lift principle of liquid flow. The liquid level on the distributor tray 108-1, facilitate increase heat exchange and mass transfer.

Referring to FIG. 2a, the distributor tray 108-1 may include at least one opening 202, hereinafter individually referred to as 'opening 202' or collectively referred to as 'openings 202. In an embodiment, a number of the openings 202 provided in the distributor tray 108-1 may vary based on various operational characteristics and dimensional characteristics of the hydro-processing reactor 100. In an example, the dimensional characteristics of the hydro-processing reactor 100 may include but is not limited to a size of the hydro-processing reactor 100. In an embodiment, the openings 202 may be arranged on the distributor tray 108-1 in an equilateral triangle array. In such an embodiment, the equilateral triangle may be defined by connecting centres of three adjacent openings on the distributor tray 108-1. In another embodiment, the openings 202 may be arranged on the distributor tray 108-1 in a square array.

In an embodiment, the openings 202 are provided for accommodating a plurality of distribution units 204-1, 204-2, 204-3, 204-4, 204-5, 204-6, . . . , 204-n. The plurality of distribution units 204-1, 204-2, 204-3, 204-4, 204-5, 204-6, . . . , 204-n may interchangeably be referred to as the distribution units 204-1, 204-2, 204-3, 204-4, 204-5, 204-6, . . . , 204-n without departing from the scope of the present disclosure. In an embodiment, the distribution units 204-1, 204-2, 204-3, 204-4, 204-5, 204-6, . . . , 204-n may collectively be referred to as the distribution units 204, without departing from the scope of the present disclosure. Although, plurality of openings 202 and plurality of distribution units 204 are illustrated in the figure, the distributor tray 108-1 may include only one opening 202 and one distribution unit 204, without departing from the scope of the present disclosure.

In an embodiment, the distribution units 204 may be adapted to mix the flow of the gas and the flow of the liquid to form a multi-phase fluid mixture. Further, the distribution units 204 may be adapted to distribute the multi-phase fluid mixture on the catalyst beds 110-1, 110-2. Construction and operational details of the distribution units 204 are explained in detail in the description of FIG. 3, FIG. 4, FIG. 5, and FIG. 6 of the present disclosure.

Referring to FIG. 1, the catalyst beds 110-1, 110-2 may be disposed within the housing member 102. The catalyst beds 110-1, 110-2 may be equally spaced apart from each other along the downward direction within the housing member 102. In an embodiment, the catalyst beds 110-1, 110-2 may be positioned between successive distributor trays i.e., the distributor trays 108-1, 108-2. In particular, the catalyst bed 110-1 may be positioned downstream of the distributor tray 108-1 within the housing member 102. Similarly, the catalyst bed 110-2 may be positioned downstream of the distributor tray 108-2 within the housing member 102. The catalyst bed 110-1 may receive the multi-phase fluid mixture from the distribution units 204 accommodated by the distributor tray 108-1. In an embodiment, the multi-phase fluid mixture may undergo the chemical process, such as the hydro-treating and the hydro-cracking, in presence of a catalyst material disposed on the catalyst bed 110-1.

In an embodiment, the catalyst material may include, but is not limited to, Ni—Mo catalysts, Co—Mo catalysts, and zeolites based catalysts. In an embodiment, the catalyst material may be selected based on a type of the chemical process, such as hydro-cracking and hydro-treating, to be performed in the hydro-processing reactor 100.

In an embodiment, the hydro-processing reactor 100 may include a plurality of quench boxes 112 positioned within the housing member 102. The plurality of quench boxes 112 may individually be referred to as quench box 112, without departing from the scope of the present disclosure. In an embodiment, the quench box 112 may be positioned downstream of the catalyst bed 110-1 and upstream of the distributor tray 108-2. The quench box 112 may be adapted to reduce a temperature of the multi-phase fluid mixture received from the catalyst bed 110-1. In an embodiment, the quench box 112 may reduce the temperature of the multi-phase fluid mixture received from the catalyst bed 110-1 in a presence of a quench fluid. Subsequently, the quench box 112 may discharge the multi-phase fluid mixture to the distributor tray 108-2 positioned downstream to the quench box 112. Further, the multi-phase fluid may be distributed on the catalyst bed 110-2 positioned downstream to the distributor tray 108-2. The quench fluid may be a hydrogen gas which is supplied to the quench box 112 through a conduit 114. In an embodiment, the quench fluid may be embodied as a gas, a liquid, or a mixture of gas and liquid.

Figure 3A:
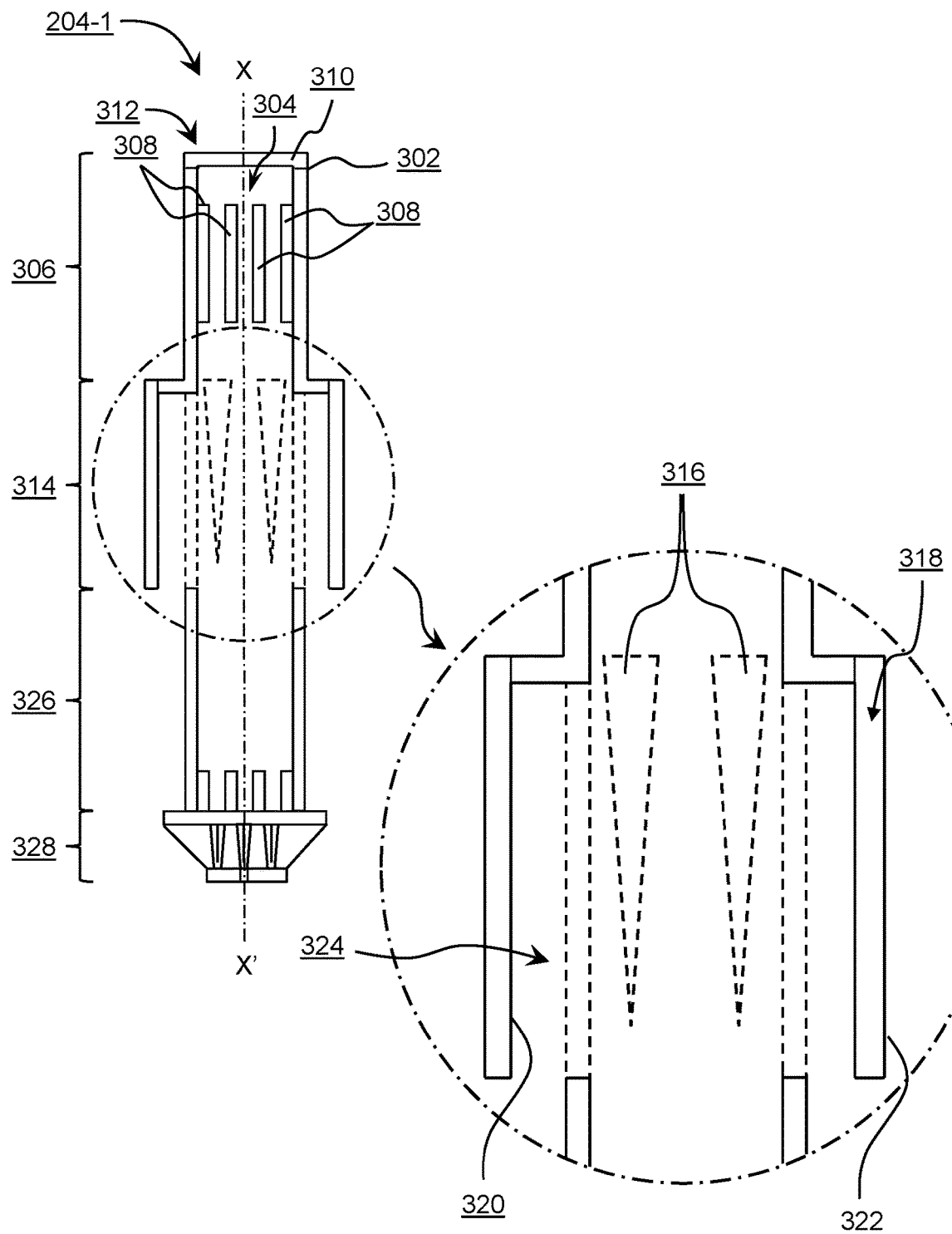
FIGS. 3a and 3b illustrate partial sectional views of a distribution unit, according to an embodiment of the present disclosure.
Figure 3B:
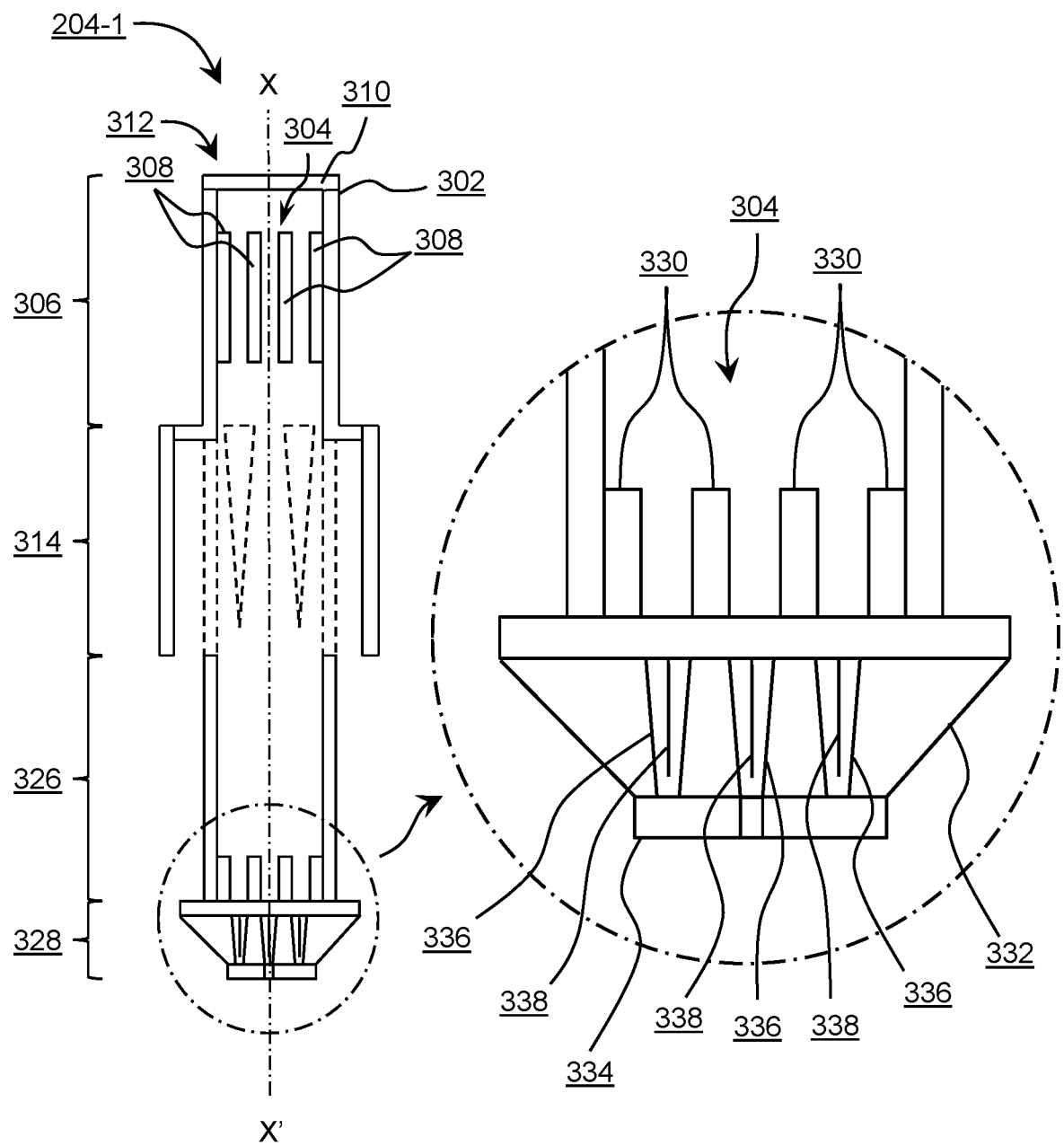

FIGS. 3a and 3b illustrate partial sectional views of the distribution unit, such as the distribution unit 204-1, according to an embodiment of the present disclosure. For the sake of simplicity and better understanding, the present disclosure is explained with respect the distribution unit 204-1 of the hydro-processing reactor 100. As would be appreciated by the person skilled in the art, the description of the distribution unit 204-1 is equally applicable to other distribution units 204-2, 204-3, 204-4, 204-5, 204-6, . . . , 204-n of the hydro-processing reactor 100, without departing from the scope of the present disclosure.

Referring to FIG. 3a and FIG. 3b, the distribution unit 204-1 may include a distribution body 302 defining a first passage 304. The first passage 304 may be adapted to allow a flow of the multi-phase fluid mixture. In an embodiment, the distribution body 302 may have a substantially cylindrical shape, without departing from the scope of the present disclosure. The first passage 304 may extend along a longitudinal axis X-X' of the distribution body 302 of the distribution unit 204-1. Although the embodiment of FIGS. 3a and 3b, includes the distribution body 302 having a substantially cylindrical shape, it will be appreciated by those skilled in the art that the distribution body 302 may have different shapes and sizes in accordance with the present disclosure.

Referring to FIG. 3a, the distribution body 302 may include a first body portion 306 having a plurality of first inlet slots 308. The plurality of first inlet slots 308 may interchangeably be referred to as the first inlet slots 308, without departing from the scope of the present disclosure. The first inlet slots 308 may be provided to allow the flow of the gas in the first passage 304. In particular, the first inlet slots 308 may allow the flow of the gas received from the inlet conduit 104 in the first passage 304 of the distribution unit 204-1.

In an embodiment, the first inlet slots 308 may be circumferentially distributed on a surface of the first body portion 306. The first inlet slots 308 may be equally spaced apart from each other on the surface of the first body portion 306. In an embodiment, each of the first inlet slots 308 may extend along the longitudinal axis X-X' on the surface of the first body portion 306. In an embodiment, each of the first inlet slots 308 may have a substantially rectangular shape. In an embodiment, dimensional characteristics, such as shape and size, of the first inlet slots 308 of the distribution unit 204-1 may vary based on the operational and dimensional characteristics of the hydro-processing reactor 100.

Further, the distribution unit 204-1 may also include a cover member 310 disposed on a top end 312 of the distribution body 302. The cover member 310 may be adapted to restrict the flow of the liquid, received from the inlet conduit 104, into the first passage 304 through the top end 312 of the distribution body 302.

Further, the distribution body 302 may include a second body portion 314 disposed downstream of the first body portion 306. The second body portion 314 may include a plurality of second inlet slots 316. The plurality of second inlet slots 316 may interchangeably be referred to as the second inlet slots 316, without departing from the scope of the present disclosure. The second inlet slots 316 may be provided to allow the flow of the liquid in the first passage 304. In an embodiment, the flow of the liquid entered in the first passage 304 through the second inlet slots 316 may mix with the flow of the gas to form the multi-phase fluid mixture within the first passage 304.

In an embodiment, the second inlet slots 316 may be circumferentially distributed on a surface of the second body portion 314. The second inlet slots 316 may be equally spaced apart from each other on the surface of the second body portion 314. In an embodiment, each of the second inlet slots 316 may extent along the longitudinal axis X-X' on the surface of the second body portion 314. In an embodiment, each of the second inlet slots 316 may have a substantially triangular shape. In an embodiment, dimensional characteristics, such as shape and size, of the second inlet slots 316 of the distribution unit 204-1 may vary based on the operational and dimensional characteristics of the hydro-processing reactor 100.

The distribution unit 204-1 may also include a cap member 318 affixed to the second body portion 314. The cap member 318 may cover the second inlet slots 316 formed on the second body portion 314. In an embodiment, the cap member 318 may include an inner surface 320 and an outer surface 322 distal to the inner surface 320. The cap member 318 may be affixed to the second body portion 314 in a manner that the inner surface 320 may face towards the surface of the second body portion 314. In an embodiment, the cap member 318 may be affixed on the second body portion 314 in a manner that a second passage 324 may be defined between the cap member 318 and the second body portion 314. In particular, the second passage 324 may be defined between the inner surface 320 of the cap member 318 and the surface of the second body portion 314. The second passage 324 may be adapted to allow the flow of the liquid to the first passage 304 through the second inlet slots 316.

Figure 4:
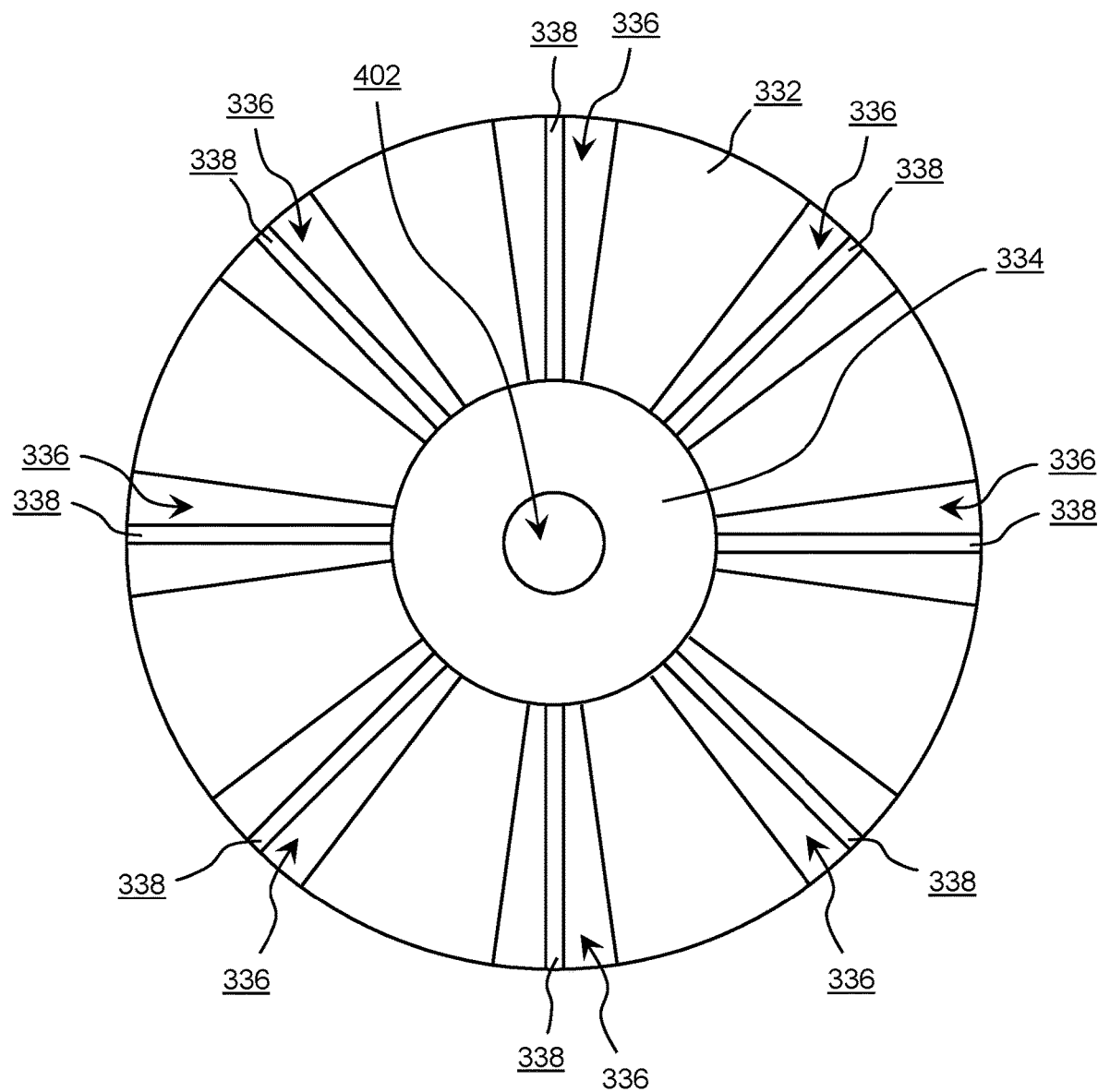
FIG. 4 illustrates a bottom view of the distribution unit, according to an embodiment of the present disclosure.

FIG. 4 illustrate a bottom view of the distribution unit, such as the distribution unit 204-1, according to an embodiment of the present disclosure. Referring to FIG. 3a, FIG. 3b, and FIG. 4, the distribution body 302 may include a first distal body portion 326 and a second distal body portion 328. The first distal body portion 326 may be disposed downstream of the second body portion 314. The first distal body portion 326 may include a plurality of first slots 330 in fluid communication with the first passage 304. In an embodiment, the plurality of first slots 330 may interchangeably be referred to as the first slots 330, without departing from the scope of the present disclosure. The first slots 330 may discharge the flow of the multi-phase fluid flowing within the first passage 304 of the distribution unit 204-1.

In an embodiment, each of the first slots 330 may be circumferentially distributed on a surface of the first distal body portion 326. The first slots 330 may be equally spaced apart from each other on the surface of the first distal body portion 326. In an embodiment, each of the first slots 330 may have a substantially rectangular shape. In an embodiment, dimensional characteristics, such as shape and size, of the first slots 330 of the distribution unit 204-1 may vary based on the operational and dimensional characteristics of the hydro-processing reactor 100.

Further, the second distal body portion 328 may be disposed downstream of the first distal body portion 326. The second distal body portion 328 may have a substantially truncated conical shape. In an embodiment, the second distal body portion 328 may include a side wall 332 and a bottom wall 334. The side wall 332 may interchangeably be referred to as the inclined wall 332, without departing from the scope of the present disclosure. The second distal body portion 328 may include a plurality of second slots 336 distributed on the inclined wall 332 of the second distal body portion 328. In an embodiment, the plurality of second slots 336 may interchangeably be referred to as the second slots 336, without departing from the scope of the present disclosure. The second slots 336 may be in fluid communication with the first passage 304 defined in the distribution unit 204-1. The second slots 336 may discharge the flow of the multi-phase fluid flowing within the first passage 304 of the distribution unit 204-1.

In an embodiment, the second slots 336 may be circumferentially distributed on the inclined wall 332 of the second distal body portion 328. The second slots 336 may be equally spaced apart from each other on the inclined wall 332 of the second distal body portion 328. In an embodiment, each of the second slots 336 may have a substantially triangular shape. In an embodiment, dimensional characteristics, such as shape and size, of the second slots 336 of the distribution unit 204-1 may vary based on the operational and dimensional characteristics of the hydro-processing reactor 100.

Referring to FIG. 4, each of the plurality of second slots 336 may be adapted to accommodate a baffle plate 338. In an embodiment, the baffle plate 338 is adapted to equally divide each of the plurality of second slots 336 in a pair of slots for discharging the flow of the multi-phase fluid. Further, the second distal body portion 328 may include an aperture 402 formed on the bottom wall 334 of the second distal body portion 328. The aperture 402 may be in fluid communication with the first passage 304 to discharge the flow of the multi-phase fluid mixture flowing in the first passage 304. In an embodiment, the aperture 402 may have a substantially circular shape. In an embodiment, dimensional characteristics, such as shape and size, of the aperture 402 of the distribution unit 204-1 may vary based on the operational and dimensional characteristics of the hydro-processing reactor 100.

Figure 5:
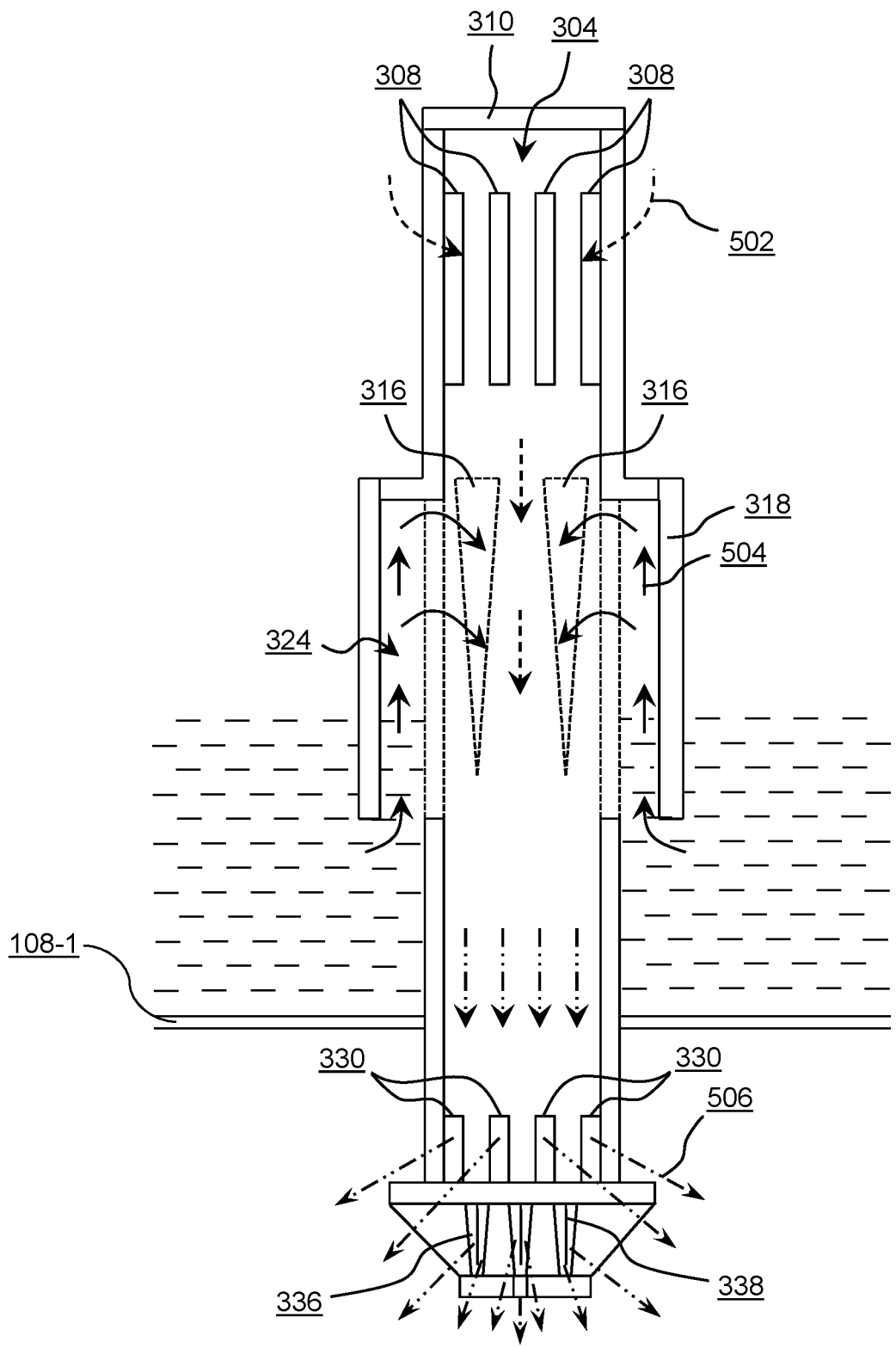
FIG. 5 illustrates a sectional view of the distribution unit depicting distribution of a multi-phase fluid mixture from the distribution unit, according to an embodiment of the present disclosure.

FIG. 5 illustrates a sectional view of the distribution unit, such as the distribution unit 204-1, depicting distribution of the multi-phase fluid mixture from the distribution unit 204-1, according to an embodiment of the present disclosure. During an operation of the hydro-processing reactor 100, the flow of the gas 502 and the flow of the liquid 504 may be allowed in the housing member 102 (shown in FIG. 1) through the inlet conduit 104. Subsequently, the distributor tray 108-1 may collect the flow of the liquid 504 to facilitate distribution of the multi-phase fluid mixture 506 through the distribution unit 204-1. Further, the distribution unit 204-1 may allow the flow of the gas 502 within the first passage 304 through the first inlet slots 308.

As shown in FIG. 5, the distribution unit 204-1 may be accommodated on the distributor tray 108-1 in a manner that a portion of the first distal body portion 326 and the second distal body portion 328 may extend below the distributor tray 108-1. In an embodiment, the distribution unit 204-1 may be accommodated on the distributor tray 108-1 in a manner that a distance between the second inlet slots 316 and the distributor tray 108-1 may be in a range of 1 inch to 5 inch. Owing to such an arrangement, the distributor tray 108-1 may provide a settling space for particulate matters present in the multi-phase fluid mixture.

Upon receiving the flow of the gas 502 within the first passage 304, a pressure difference will be generated between the first passage 304 of the distribution unit 204-1 and the second passage 324. As explained earlier, the second passage 324 may be defined between the inner surface 320 of the cap member 318 and the surface of the second body portion 314 of the distribution unit 204-1. Due to the pressure difference, the liquid collected on the distributor tray 108-1 may flow to the second passage 324. Subsequently, the liquid may enter the first passage 304 through the second inlet slots 316 formed on the second body portion 314 of the distribution unit 204-1. Upon receiving the flow of the liquid 504 within the first passage 304, the flow of the liquid 504 and the flow of the gas 502 may mix within the first passage 304 to form the multi-phase fluid mixture 506. As mentioned earlier, the second inlet slots 316 may have the substantially triangular shape. Owing to such shape of the second inlet slots 316, when a volume of liquid on the distributor tray 108-1 increases, the second inlet slots 316 may allow a higher volume of the liquid to enter in the first passage 304 through the second passage 324.

Thereafter, the distribution unit 204-1 may discharge the flow of the multi-phase fluid mixture 506 through the first distal body portion 326 and the second distal body portion 328. In an embodiment, the distribution unit 204-1 may distribute the multi-phase fluid mixture on the catalyst bed 110-1 disposed below the distributor tray 108-1, through the first slots 330 formed on the first distal body portion 326. Further, the distribution unit 204-1 may also distribute the multi-phase fluid on the catalyst bed 110-1 through the second slots 336 and the aperture 402 formed on the second distal body portion 328. As mentioned earlier, the second distal body portion 328 may have the substantially truncated conical shape. Further, the second slots 336 and the aperture 402 may be formed on the inclined wall 332 and the bottom wall 334 of the second distal body portion 328. Owing to such construction of the second distal body portion 328 and the second slots 336, the multi-phase fluid mixture may be discharged at a wider angle which leads to uniform distribution of the multi-phase fluid mixture on the catalyst bed 110-1.

Figure 6:
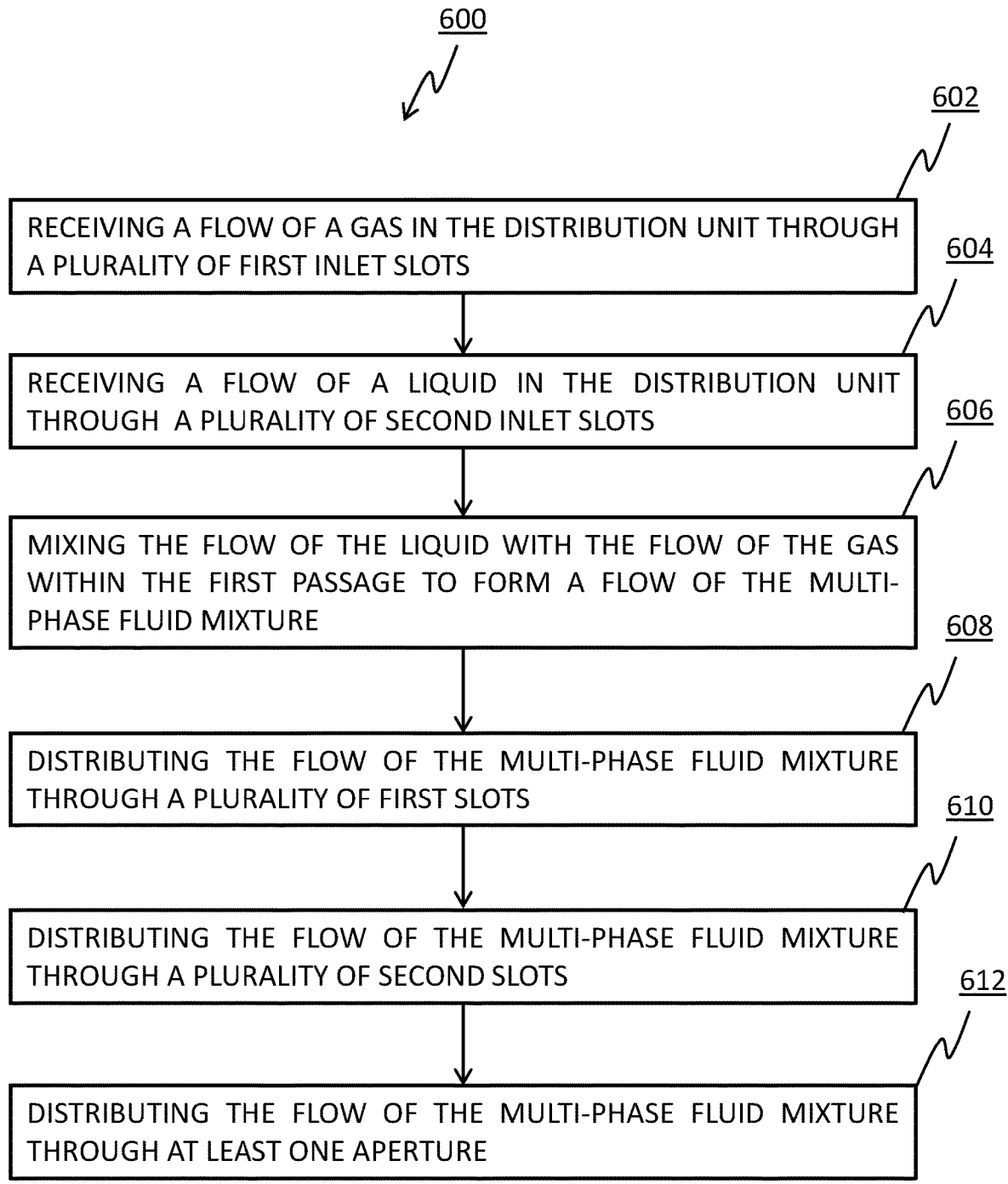
FIG. 6 illustrates a flow diagram depicting a method for distributing the multi-phase fluid mixture in the hydro-processing reactor, according to an embodiment of the present disclosure.

FIG. 6 illustrates a flow diagram depicting a method 600 for distributing the multi-phase fluid mixture in the hydro-processing reactor 100, according to an embodiment of the present disclosure. For the sake of brevity, features of the distribution unit 204-1 that are already explained in detail in the description of FIG. 1, FIG. 2a, FIG. 2b, FIG. 3a, FIG. 3b, FIG. 4, and FIG. 5 are not explained in detail in the description of FIG. 6.

At block 602, the method 600 includes receiving the flow of the gas in the distribution unit 204-1. The distribution unit 204-1 comprises the distribution body 302 defining the first passage 304 adapted to receive the flow of the gas through the plurality of first inlet slots 308.

At block 604, the method 600 includes receiving the flow of the liquid in the distribution unit 204-1. The distribution unit 204-1 includes the cap member 318 affixed to the second body portion 314 and defining the second passage 324 between the cap member 318 and the second body portion 314. The second passage 324 is adapted to allow the flow of the liquid to the first passage 304 through the plurality of second inlet slots 316. In particular, when the flow of the gas enters the first passage 304, the pressure difference is generated between the first passage 304 and the second passage 324. Owing to such pressure difference, the liquid may flow through the plurality of second inlet slots 316 in the first passage 304 of the distribution unit 204-1.

At block 606, the method 600 includes mixing the flow of the liquid with the flow of the gas within the first passage 304 to form the flow of the multi-phase fluid mixture. In an embodiment, the flow of the gas within the first passage 304 may mix with the flow of the liquid entering in the first passage 304 through the plurality of second inlet slots 316 to form the multi-phase fluid mixture.

At block 608, the method 600 includes distributing the flow of the multi-phase fluid mixture through the plurality of first slots 330. The plurality of first slots 330 may be formed on the distribution body 302. The plurality of first slots 330 may be in fluid communication with the first passage 304.

At block 610, the method 600 includes distributing the flow of the multi-phase fluid mixture through the plurality of second slots 336. The plurality of second slots 336 may be disposed downstream to the plurality of first slots 330 on the distribution body 302. Further, the plurality of second slots 336 may be in fluid communication with the first passage 304.

At block 612, the method 600 includes distributing the flow of the multi-phase fluid mixture through the at least one aperture 402. The at least one aperture 402 may be disposed downstream to the plurality of first slots 330 on the distribution body 302. The at least one aperture 402 may be in fluid communication with the first passage 304.

As would be gathered, the present disclosure offers the distribution units 204 and the method 600 for distributing the multi-phase fluid mixture. The distribution unit 204-1 includes the distribution body 302 defining the first passage 304 for the flow of the multi-phase fluid mixture. Further, the distribution unit 204-1 includes the cap member 318 affixed to the second body portion 314 of the distribution unit 204-1. The cap member 318 may be affixed to the second body portion 314 in a manner that the second passage 324 is defined between the cap member 318 and the second body portion 314. The second passage 324 may allow the flow of the liquid to the first passage 304 through the second inlet slots 316, when the pressure difference is generated due to the flow of the gas within the first passage 304. Thereby, the distribution unit 204-1 may allow an improved mixing of the flow of the gas and the flow of the liquid within the first passage 304 to form the multi-phase fluid mixture.

As explained earlier, the pressure difference generated due to the flow of the gas may lift the liquid from the distributor tray 108-1 to the second passage 324. Subsequently, the liquid may flow through the second passage 324, and enters in the first passage 304 through the second inlet slots 316. Owing to the flow of the liquid driven by the pressure difference due to the flow of the gas within the first passage 304, the distribution unit 204-1 is less sensitive to distributor tray levelness, and eliminates fouling in the hydro-processing reactor 100. Further, the distribution unit 204-1 contributes towards a low pressure drop for the distributor tray 108-1 which leads to substantial reduction of workload for a recycle gas compressor.

Further, the distribution unit 204-1 includes the first slots 330, the second slots 336, and the aperture 402 for distributing the multi-phase fluid mixture on the catalyst bed 110-1. As explained earlier, the second slots 336 may be formed on the inclined wall 332 of the second distal body portion 328. The second slots 336 may have the substantially triangular shape. Owing to liquid flow in pipe phenomena and the second distal body portion 328, the multi-phase fluid mixture may impact a bottom portion 334 at a substantially maximum velocity at the centre, which facilitates distribution of the multi-phase fluid mixture through the second slots 336 and the aperture 402. This leads to wider dispersion of the multi-phase fluid mixture on the catalyst bed 110-1. Therefore, the multi-phase fluid mixture is uniformly distributed over the catalyst bed 110-1. Owing to the uniform distribution of the multi-phase fluid mixture, formation of hot-spots on the catalyst bed 110-1 may be substantially reduced, which further leads to enhanced yielding of a final product, i.e., hydrocarbon feedstock and improved catalyst utilization. Further, the first slots 330 formed at the first distal body portion 326 of the distribution unit 204-1 facilitates distribution of the multi-phase fluid mixture at different turndown ratio. Furthermore, the distribution unit 204-1 of the present disclosure can be employed for a wider range of fluid flow rates, without departing from the present disclosure.

Further, each of the second slots 336 formed on the second distal body portion 328 may be adapted to accommodate the baffle plate 338. The baffle plate 338 may be provided to achieve wider dispersion of the multi-phase fluid mixture discharging from each of the second slots 336. Owing to such wider dispersion of the multi-phase fluid mixture, the distribution unit 204-1 provides uniform distribution of the multi-phase fluid mixture on the catalyst bed 110-1. Further, the uniform distribution of the multi-phase fluid mixture leads to improvement in performance of the catalyst material of the catalyst bed 110-1 during various catalytic process. The distribution units 204-1, 204-2, 204-3, 204-4, 204-5, 204-6, . . . , 204-n of the present disclosure are designed in a manner that the liquid flows on vapor lift principle, while the gas flows through separate slots similar to chimney tray for distributing the multi-phase fluid mixture on the catalyst beds 110-1, 110-2. Therefore, the present disclosure offers the distribution units 204 and the method 600 that are efficient, economical, flexible, and effective for distributing the multi-phase fluid mixture.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A distribution unit for distributing a multi-phase fluid mixture, the distribution unit comprising:
    a distribution body defining a first passage for a flow of the multi-phase fluid mixture, the distribution body comprising:
        a first body portion having a plurality of first inlet slots to allow a flow of gas in the first passage;
        a second body portion disposed downstream to the first body portion, and having a plurality of second inlet slots to allow a liquid in the first passage, wherein the flow of the liquid mixes with the flow of the gas to form the multi-phase fluid mixture within the first passage;
        a cap member affixed to the second body portion and exterior to the second inlet slots and defining a second passage between the cap member and the second body portion;
        a third body portion having a plurality of first slots in fluid communication with the first passage, wherein the plurality of first slots discharges the flow of the multi-phase fluid mixture; and
        a fourth body portion disposed vertically downward to the third body portion, the fourth body portion comprises:
            a plurality of second slots distributed on a side wall of the fourth body portion, each of the plurality of second slots being adapted to accommodate a baffle plate; and
            at least one aperture formed on a bottom wall of the fourth body portion,
            wherein the plurality of second slots and the at least one aperture are in fluid communication with the first passage to discharge the flow of the multi-phase fluid mixture.

2. The distribution unit as claimed in claim 1, wherein the baffle plate is adapted to equally divide each of the plurality of second slots in a pair of slots for discharging the flow of the multi-phase fluid mixture.

3. The distribution unit as claimed in claim 1, wherein the fourth body portion has a substantially truncated conical shape.

4. The distribution unit as claimed in claim 1, wherein each of the plurality of second slots has a substantially triangular shape.

5. The distribution unit as claimed in claim 1, wherein each of the plurality of second inlet slots has a substantially triangular shape.

6. The distribution unit as claimed in claim 1 further comprises a cap member affixed to the second body portion and defining a second passage between the cap member and the second body portion.

7. The distribution unit as claimed in claim 6, wherein the second passage is adapted to allow the flow of the liquid to the first passage through the plurality of second inlet slots.

8. A distribution unit for a hydro-processing reactor, the distribution unit comprising:
    a distribution body defining a first passage for a flow of the multi-phase fluid mixture, the distribution body comprising:
        a first body portion having a plurality of first inlet slots to allow a flow of a gas in the first passage; and
        a second body portion disposed downstream to the first body portion, and having a plurality of second inlet slots to allow a flow of a liquid in the first passage, wherein the flow of the liquid mixes with the flow of the gas to form the multi-phase fluid mixture within the first passage; and
        a cap member affixed to the second body portion and exterior to the second inlet slots and defining a second passage between the cap member and the second body portion,
    wherein the second passage is adapted to allow the flow of the liquid to the first passage through the plurality of second inlet slots.

9. The distribution unit as claimed in claim 8 further comprises a first distal body portion having a plurality of first slots in fluid communication with the first passage, wherein the plurality of first slots discharges the flow of the multi-phase fluid mixture.

10. The distribution unit as claimed in claim 9 further comprises a second distal body portion disposed downstream to the first distal body portion, the second distal body portion comprises:
    a plurality of second slots distributed on a side wall of the second distal body portion, each of the plurality of second slots being adapted to accommodate a baffle plate;
    at least one aperture formed on a bottom wall of the second distal body portion; and
    wherein the plurality of second slots and the at least one aperture are in fluid communication with the first passage to discharge the flow of the multi-phase fluid mixture.

11. A hydro-processing reactor comprising:
    at least one distributor tray;
    at least one catalyst bed disposed below the at least one distributor tray; and
    a plurality of distribution units arranged on the at least one distributor tray, and being adapted to distribute a multi-phase fluid mixture on the at least one catalyst bed, wherein each of the plurality of distribution units comprising:
        a distribution body defining a first passage for a flow of the multi-phase fluid mixture, the distribution body comprising:
            a first body portion having a plurality of first inlet slots to allow a flow of gas in the first passage;
            a second body portion disposed downstream to the first body portion, and having a plurality of second inlet slots to allow a liquid in the first passage, wherein the flow of the liquid mixes with the flow of the gas to form the multi-phase fluid mixture within the first passage;

a cap member affixed to the second body portion and exterior to the second inlet slots and defining a second passage between the cap member and the second body portion;

a third body portion having a plurality of first slots in fluid communication with the first passage, wherein the plurality of first slots discharges the flow of the multi-phase fluid mixture; and a fourth body portion disposed downstream to the third body portion, the fourth body portion comprises:
- a plurality of second slots distributed on a side wall of the fourth body portion, each of the plurality of second slots being adapted to accommodate a baffle plate;
- at least one aperture formed on a bottom wall of the fourth body portion; and
- wherein the plurality of second slots and the at least one aperture are in fluid communication with the first passage to discharge the flow of the multi-phase fluid mixture.

12. The hydro-processing reactor as claimed in claim 11, wherein each of the plurality of distribution unit further comprises a cap member affixed to the second body portion and defining a second passage between the cap member and the second body portion.

13. The hydro-processing reactor as claimed in claim 12, wherein the second passage is adapted to allow the flow of the liquid to the first passage through the plurality of second inlet slots.

* * * * *